US006580538B1

United States Patent
Kartalopoulos

(10) Patent No.: US 6,580,538 B1
(45) Date of Patent: Jun. 17, 2003

(54) REDUCTION OF OPTICAL IMPAIRMENTS IN WAVELENGTH DIVISION MULTIPLEXED SYSTEMS EMPLOYING A WAVELENGTH BUS ARCHITECTURE

(75) Inventor: Stamatios Vasilios Kartalopoulos, Annandale, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/383,702

(22) Filed: Aug. 26, 1999

Related U.S. Application Data

(60) Provisional application No. 60/101,302, filed on Sep. 22, 1998.

(51) Int. Cl.[7] .................................................. H04J 14/02
(52) U.S. Cl. ...................................... 359/124; 359/181
(58) Field of Search ................................. 359/161, 124, 359/123, 181

(56) References Cited

U.S. PATENT DOCUMENTS

| | | | | |
|---|---|---|---|---|
| 4,736,464 A | * | 4/1988 | Tanson ........................ | 359/175 |
| 5,040,170 A | | 8/1991 | Upp et al. .................... | 359/135 |
| 5,136,587 A | | 8/1992 | Obana et al. ................ | 370/112 |
| 5,157,530 A | | 10/1992 | Loeb et al. .................. | 359/124 |
| 5,535,373 A | | 7/1996 | Olnowich .................... | 395/500 |
| 5,742,605 A | | 4/1998 | Norman, Jr. ................. | 370/405 |
| 5,751,454 A | | 5/1998 | MacDonald et al. ........ | 359/119 |
| 5,784,184 A | | 7/1998 | Alexander et al. .......... | 359/125 |
| 5,793,510 A | | 8/1998 | Samejima et al. ........... | 359/158 |
| 5,793,770 A | | 8/1998 | St. John et al. ............. | 370/401 |
| 5,796,502 A | | 8/1998 | Haller, Jr. | |
| 6,101,561 A | | 8/2000 | Beers et al. .................. | 710/66 |
| 6,259,555 B1 | | 7/2001 | Meli et al. ................... | 359/337 |
| 6,377,377 B1 | * | 4/2002 | Gehlot ......................... | 359/154 |

OTHER PUBLICATIONS

Kaminow, I. P. et al., *Optical Fiber Telecommunications IIIA*, pp. 199–203, 212–225, 239–248.

Bergman, L. et al., "Dynamic Alignment of Pulses in Bit–Parallel Wavelength Links Using a Shepherd Pulse in Nonlinear Fibers for Massively Parallel Processing Computer Networks", *IEEE Computer Society Press*, Los Alamitos, CA, Oct. 27–29, 1996, pp. 70–76.

Bergman, L. A. et al., "Bit–Parallel Wavelength Links for High Performance Computer Networks", *Critical Reviews of Optical Science and Technology*, vol. CR62, Jan. 30–31, 1996, pp. 210–226.

Maeda, M. W. et al., "The Effect of Four–Wave Mixing in Fibers on Optical Frequency–Divison Multiplexed Systems", *J. of Lightwave Technology*, vol. 8, No. 9, Sep. 1990, pp. 1402–1408.

F. Forghieri, et al., "WDM Systems with Unequally Spaced Channels", *J. of Lightwave Technology*, vol. 13, No. 5, May 995, pp. 889–897.

Copending U. S. application Ser. No. 09/237,122, filed on Jan. 26, 1999 (Kartalopoulos 11).

Copending U. S. application Ser. No. 09/250,345, filed on Feb. 16, 1999 (Kartalopoulos 12).

Copending U. S. application Ser. No. 09/244,216, filed Feb. 4, 1999 (Kartalopoulos 14).

* cited by examiner

*Primary Examiner*—John Tweel
(74) *Attorney, Agent, or Firm*—Gregory J. Murgia

(57) ABSTRACT

Crosstalk and signal to noise degradation contributed by fiber nonlinearities in a WDM system are reduced by transporting data in a parallel format using a plurality of optical channels in a WDM signal as a parallel bus and by coding the parallel-formatted data so that bit patterns in the parallel-formatted information that would otherwise contribute to nonlinear impairments are changed. In one illustrative embodiment, an n-bit wide byte is transmitted using n optical channels (i.e., using n wavelengths) so that each of the n optical channels carries one of the n bits of the byte. In conjunction with the parallel transmission of information, a coding scheme is employed to reduce the occurrence of bit patterns, e.g., "all ones", in the n-bit wide bytes that would give rise to four wave mixing or other nonlinear effects. The coding scheme may be used to transform bytes having "all ones" bit patterns to bytes having "non-all ones" bit patterns.

15 Claims, 4 Drawing Sheets

REDUCTION OF OPTICAL IMPAIRMENTS IN WAVELENGTH DIVISION MULTIPLEXED SYSTEMS EMPLOYING A WAVELENGTH BUS ARCHITECTURE

CROSS-REFERENCE TO RELATED APPLICATIONS

This application claims the benefit of U.S. Provisional Application Serial No. 60/101,302 filed on Sep. 22, 1998. This application is related to co-pending U.S. applications Ser. No. 09/237,122 (Kartalopoulos 11) filed on Jan. 26, 1999, U.S. application Ser. No. 09/250,345 (Kartalopoulos 12) filed on Feb. 16, 1999, and U.S. application Ser. No. 09/244,216 (Kartalopoulos 14) filed on Feb. 4, 1999.

FIELD OF THE INVENTION

The invention relates generally to lightwave communication systems and, more particularly, to coding techniques used in the transmission of information in dense wavelength division multiplexing systems.

BACKGROUND OF THE INVENTION

Optical fiber is becoming a preferred transmission medium for many communication networks because of the speed and bandwidth advantages associated with optical transmission. In particular, wavelength division multiplexing (WDM) is being used to meet the increasing demands for more speed and bandwidth in optical transmission applications. In its simplest form, WDM is a technique whereby parallel data streams modulating light at different wavelengths are coupled simultaneously into the same optical fiber. A WDM signal is typically viewed as a composite signal comprising a parallel set of optical channels sharing a single transmission medium, wherein each optical channel uses a slightly different frequency (wavelength of light). Although each optical channel actually includes a range of frequencies (wavelengths), those skilled in the art typically refer to an optical channel in terms of its center wavelength. As such, the terms "optical channel", "wavelength channel", and wavelength are typically used interchangeably in the WDM context to refer to a constituent optical signal within the composite WDM signal.

With recent advances in optical networking technology, system manufacturers are now contemplating WDM systems that carry, for example, as many as 40, 80, or more optical channels in a single fiber and with bit rates up to 10 Gbps per channel. However, despite the many advantages of WDM, there are certain limitations that arise as a result of using a separate optical channel for carrying traffic from each source or user, which is a typical transport arrangement in WDM systems. For example, the number of users that can be supported by a WDM system is limited by the number of available optical channels. The total bandwidth in a WDM system may also be used inefficiently if optical channels are not being used to transport information at the maximum possible bit rate. Furthermore, the electronic components used for processing the optically transmitted information at nodes in a WDM system lag behind photonic components in terms of transmission speed capabilities. Although many user systems supply information in parallel format, prior WDM transport schemes incorporate multiple serial-to-parallel and parallel-to-serial conversions, thus resulting in latency and delay.

In optical transmission systems, it is also well-known that fiber nonlinearities can affect the integrity of data transmitted in the optical channels, thereby degrading system performance. Some of the nonlinearities include, for example, four wave mixing, stimulated Raman scattering, and stimulated Brillouin scattering, to name a few. For a more detailed description of these optical nonlinearities, see, e.g., Kaminow et al., "Optical Fiber Telecommunications", Vol. IIIA, pp. 199–203, 212–225, and 239–248 (1997) and Maeda et al., "The Effect of Four-Wave Mixing in Fibers on Optical Frequency-Division Multiplexed Systems", Journal of Lightwave Technology, Vol. 8, No. 9, pp. 1402–1408 (1990), each of which is incorporated by reference herein. Four wave mixing is of particular concern for WDM systems.

Briefly, four wave mixing is a third order nonlinearity in which three input signals generate a fourth signal which may degrade the system's performance via crosstalk. More specifically, three waves of frequencies (e.g., $f_i$, $f_j$, and $f_k$) interact through the third order electric susceptibility of the optical fiber to generate a fourth wave of frequency ($f_{fwm}$) defined by $f_{fwm}=f_i+f_j-f_k$. Thus, three co-propagating waves give rise to nine new components. In a WDM system, this interaction occurs for every possible choice of three waves (i.e., optical channels), which can result in the generation of hundreds of new components. As such, four wave mixing contribution to crosstalk and the resultant signal to noise degradation can be especially problematic for WDM systems having a plurality of optical channels.

Four wave mixing effects also depend on the coherent presence of energy. As such, four wave mixing is a concern for intensity modulated systems, e.g., where the presence of a pulse indicates the symbol or bit "one" and the absence of a pulse indicates a symbol or bit "zero". More specifically, if a bit "one" is being transmitted in one or more adjacent optical channels in the same segment of the optical fiber, then the effects of four wave mixing can be greater than a case where one channel has a bit "one" and one or more of the other channels has a bit "zero".

FIG. 1A illustrates this principle in a simplified example of a typical WDM transmission scheme in which data is transmitted serially in each of the optical channels so that data transmission in any given optical channel is independent of data transmission in another optical channel. More specifically, FIG. 1A shows three optical channels 101–103 (wavelengths λ1, λ2, and λ3), each carrying serially transmitted data represented as bit sequences, e.g., bit sequence $a_0$–$a_4$ in optical channel 101, bit sequence $b_0$–$b_4$ in optical channel 102, and bit sequence $c_0$–$c_4$ in optical channel 103. For this example, bits $a_0$, $b_0$, and $c_0$ each occur at time slot $t_0$, bits $a_1$, $b_1$, and $c_1$ at time slot $t_1$, and so on. In this way, the bits in each of the individual optical channels at a particular time slot (e.g., a bit period) are considered to be coincidental bits, e.g, $a_0$, $b_0$, and $c_0$ at time $t_0$ shown in block 104. Because effects of four wave mixing depend on bit values, e.g., "ones" or "zeros", of coincidental bits in different optical channels, traditional WDM transmission schemes that transmit data serially and independently in each optical channel therefore are particularly susceptible to crosstalk contributed by four wave mixing.

FIG. 1B illustrates how propagation delays in the individual optical channels can further complicate the identification coincidental bits having bit values which may give rise to four wave mixing effects. In particular, it is well known that light pulses may travel at different velocities in different optical channels of a WDM signal, i.e., at different wavelengths. For example, FIG. 1A shows how bits $a_4$, $b_4$, and $c_4$ are coincidental at time slot $t_4$ (e.g., within a bit period) at the transmitter end. However, these bits may not be coincidental (e.g., within a bit period) at the receiver end because of different delays experienced at different wavelengths. As shown in FIG. 1B after propagation delays, bit $a_4$ is coincidental at time $t_4$ with bits $b_3$ and $c_2$ as shown by block 105. So, bit values of coincidental bits are important both at the near-end (e.g., transmit end) and far-end (e.g., receive end) of a system since four wave mixing may develop as a result of propagation delays in the optical channels.

Consequently, advantages of using WDM in optical transmission are tempered by the problems caused by fiber nonlinearities, inefficient bandwidth utilization, and delays associated with serial-to-parallel/parallel-to-serial conversions in prior WDM transport schemes that transmit data serially in individual WDM optical channels.

SUMMARY OF THE INVENTION

Crosstalk and signal to noise degradation contributed by fiber nonlinearities in a WDM system are reduced according to the principles of the invention by transporting data in a parallel format using a plurality of optical channels in a WDM signal as a parallel bus and by coding the parallel-formatted data so that bit patterns in the parallel-formatted information that would otherwise contribute to nonlinear impairments are changed.

More specifically, a WDM parallel bus architecture is described in detail in my co-pending U.S. application Ser. No. 09/237,122 (Kartalopoulos 11), which is herein incorporated by reference in its entirety. Briefly, a WDM transport scheme characterized as a "wavelength bus" transports data in a parallel format using a group of optical channels. As one example of the parallel format, an n-bit wide byte is transmitted using n optical channels (i.e., using n wavelengths) so that each of the n optical channels carries one of the n bits of the byte. As described in this co-pending application, the wavelength bus offers a more efficient use of bandwidth for transporting information in a WDM system than prior transport schemes.

In conjunction with the wavelength bus architecture, a coding scheme is employed to reduce the occurrence of bit patterns, e.g., "all ones", in the n-bit wide bytes that would give rise to four wave mixing or other nonlinear effects. In one exemplary embodiment for example, prior to converting data from electrical to optical format, bytes having "all ones" or other defined bit patterns are detected and converted to "non-all ones" bit patterns.

As compared to per-channel serial WDM transmission schemes, a wavelength bus architecture offers many advantages such as more efficient bandwidth utilization, reduced latency because of less serial-to-parallel and parallel-to-serial conversions, and sharing of resources among a group of wavelength channels, to name a few. By coding bytes being transmitted in parallel to eliminate or otherwise reduce the occurrence of "all ones" or other bit conditions, the output power of a four-wave mixing product, for example, is minimized. By reducing the effects of nonlinear optical impairments in a WDM system operated according to the principles of the invention, several benefits can be realized. For example, channel density (i.e., number of optical channels/wavelengths) can be increased, thus increasing the aggregate bandwidth in a fiber. Moreover, power per wavelength can be increased, thus increasing the length of fiber spans without additional amplification.

BRIEF DESCRIPTION OF THE DRAWINGS

A more complete understanding of the present invention may be obtained from consideration of the following detailed description of the invention in conjunction with the drawings in which.

DETAILED DESCRIPTION OF THE INVENTION

Before describing the specific embodiments of the present invention, a brief overview of the wavelength bus architecture will be provided to facilitate a better understanding of the principles of the invention. After describing the wavelength bus architecture, several embodiments of the invention will be described that can be used in conjunction with the wavelength bus transport scheme.

Figure 2:
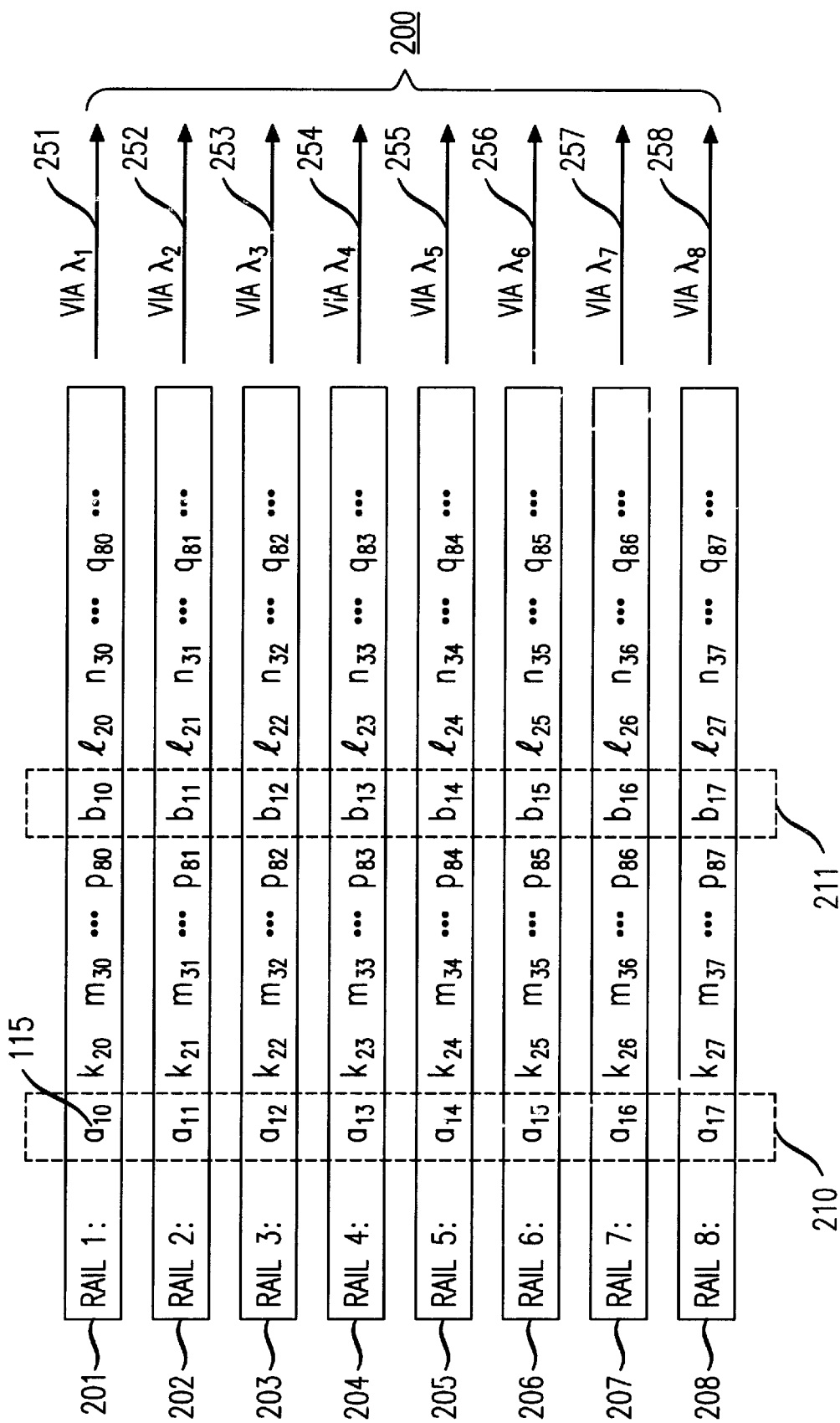
FIG. 2 is a simplified diagram showing one exemplary data structure for transporting information in a wavelength bus according to the principles of the invention.

To solve the aforementioned problems associated with per-channel serial transport of data in prior WDM systems, a WDM transport scheme was proposed in my co-pending U.S. application Ser. No. 09/237,122 (Kartalopoulos 11), filed Jan. 26, 1999, which is herein incorporated by reference in its entirety. Briefly, FIG. 2 shows an example of how data is transported according to the wavelength bus architecture. Wavelength bus 200 comprises optical channels 251–258 (at wavelengths $\lambda_1$ to $\lambda_8$) wherein each of optical channels 251–258 is used to transport information from one or more sources (not shown) supplied in a parallel format via rails 201–208. As shown, the information to be transported via wavelength bus 200 is organized in bytes using parallel byte interleaving. By way of example, byte 210, the structure of which is representative of the other bytes as well, comprises 8 bits, one of which is shown as bit 215. Byte 210 includes bits $a_{10}$ through $a_{17}$, wherein $a_{10}$ represents bit 0 of byte a supplied by source 1, $a_{17}$ represents bit 7 of byte a supplied by source 1, and so on. Because the data is in a parallel format, each of rails 201–208 includes one bit of each byte, such as byte 210. As a result, wavelength bus 200 is effectively an 8-bit wide bus using 8 different optical channels 251–258 to transport each byte supplied via rails 201–208.

In the example shown in FIG. 2, 8-bit bytes are byte interleaved so that bytes from a particular traffic source are repeated every eight parallel bytes. More specifically, byte 210 ($a_{10}$–$a_{17}$) from source 1 is supplied via rails 201–208 so that bit $a_{10}$ is transported in optical channel 251 (at wavelength $\lambda_1$), bit $a_{11}$ is transported in optical channel 252 (at wavelength $\lambda_2$), and so on. The next byte from source 1 is byte 211 ($b_{10}$–$b_{17}$) which is byte interleaved according to a byte repetition rate and transported using the same optical channels 251–258 (at wavelengths $\lambda_1$–$\lambda_8$) in wavelength bus 200. In this example, a byte repetition rate is selected so that byte 211 from source 1 is transmitted after intervening bytes from other sources are transmitted, e.g., bytes k and l from source 2, bytes m and n from source 3, bytes p and q from source 8, and so on.

Although a bit stream is still serially transmitted within each optical channel 251–258 (wavelengths $\lambda_1$–$\lambda_8$), a byte of information from any given source is transmitted in parallel using all optical channels 251–258 (wavelengths $\lambda_1$–$\lambda_8$) comprising wavelength bus 200. Accordingly, parallel transmission in the wavelength bus requires that each optical channel 251–258 (wavelengths $\lambda_1$–$\lambda_8$) comprising wavelength bus 200 transmit at the same transmission bit rate regardless of the bit rate of the signal sources.

The exemplary wavelength bus architecture described in FIG. 2 is meant to be illustrative only and not limiting in any way. For example, a byte size of 8 bits was used as an example, but the byte size may be any number of bits. Wavelength bus 200 is also shown to include 8 optical channels 251–258 (wavelengths $\lambda_1$–$\lambda_8$), however, wavelength bus 200 may comprise any number of optical channels. As will be described in more detail, a single optical fiber carrying a WDM signal may also have more than one wavelength bus therein. For example, a wavelength division multiplexed signal can be partitioned into multiple wavelength buses with each wavelength bus sized according to the bandwidth requirements of the traffic to be transported. The wavelength bus is sized by changing the number of optical channels, i.e., wavelength channels, by changing the transmission bit rate for the optical channels in the wavelength bus, or by a combination of both. One wavelength bus can transport a combination of differently formatted traffic (e.g., SONET, ATM, IP, etc.) as well as traffic supplied at different bit rates. Alternatively, because different types of traffic have different requirements, a group of wavelength buses may be partitioned so that each wavelength bus is sized to transport one type of traffic within that wavelength bus.

Figure 3:
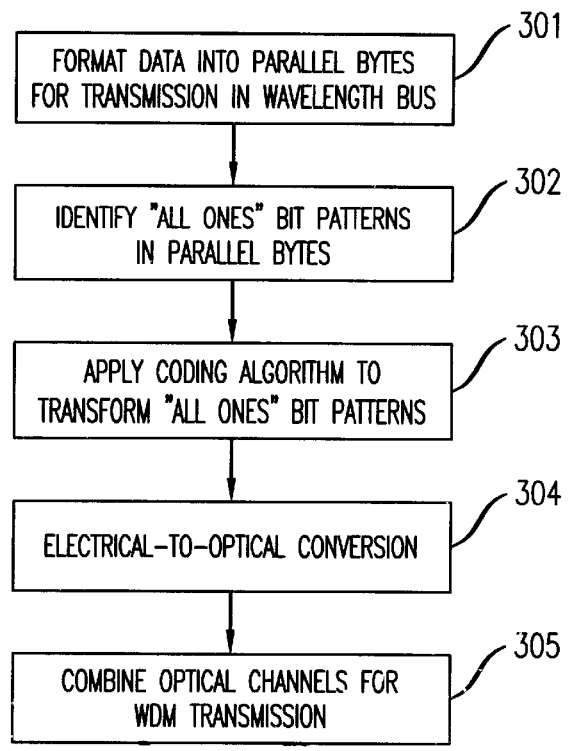
FIG. 3 is a flow chart showing the method steps according to an exemplary embodiment of the invention.

According to the principles of the invention, coding schemes can be applied to information transported in a wavelength bus to reduce the adverse effects caused by the aforementioned non-linear optical impairments. More specifically, FIG. 3 shows a flow chart illustrating the steps according to one embodiment of the invention. In step 301, data is formatted into parallel bytes for transmission in parallel format according to the wavelength bus architecture described in detail in U.S. application Ser. No. 09/237,122 (Kartalopoulos 11). As described, a byte is formatted for transmission so that bits corresponding to the byte are transmitted in each of the optical channels comprising the wavelength bus. At this point in the scheme, it should be noted that the data is still in its electronic form.

Figure 4:
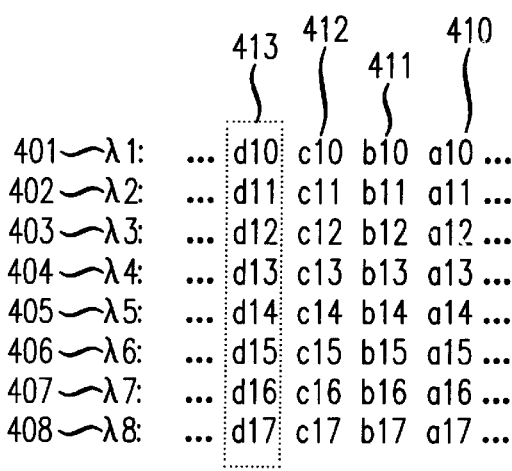
FIG. 4 illustrates how coding can be applied to bytes transmitted in parallel in a wavelength bus according to the principles of the invention.

According to step 302, bytes are checked for "all ones" bit patterns. Because the bytes have been formatted in parallel, the bits corresponding to a particular byte are coincidental bits at a given time slot. As such, a check for "all ones" in a byte effectively checks for conditions that would give rise to the aforementioned nonlinearities, e.g., "all ones" in coincidental bits in adjacent optical channels at a particular time slot. FIG. 4 illustrates the data structure of the parallel-formatted bytes which are to be transmitted in the wavelength bus according to the principles of the invention. More specifically, the wavelength bus is shown to include eight channels 401–408 (to be transmitted via wavelengths $\lambda 1$ to $\lambda 8$), each carrying a serial bit stream. However, the bytes 410–413 are in parallel format so that bits in a particular byte are coincidental bits carried in respective channels of the wavelength bus. For example, byte 413 is shown to include bits $d_{10}$ ... $d_{17}$, which are coincidental at time $t_3$, wherein $d_{10}$ is transmitted in the first channel, $d_{11}$ in the second channel and so on. Referring again to step 302, byte 413, for example, is checked to see if bits $d_{10}$ ... $d_{17}$ contain an "all ones" bit pattern.

It will be appreciated that various techniques and devices/components may be used to check for "all ones" conditions in the parallel-formatted data. As one of many examples, a simultaneous in-parallel check may be accomplished across each channel in the bus using a simple eight-input AND logic gate arrangement. When all eight inputs have a logic "one" (e.g., where each input corresponds to one of the channels in the bus), then the output of the AND gate would be a logic "one" to indicate an "all ones" condition in the bit pattern and a logic "zero" to indicate a "non-all ones" bit pattern.

It should also be noted that testing for "all ones" bit patterns is meant to be illustrative of one exemplary embodiment. As will be described in more detail, it may also be desirable to detect bit patterns that, while not containing "all ones", do contain enough "ones" to possibly give rise the aforementioned problems, e.g., four wave mixing effects. These other problematic bit patterns may either be pre-defined or may be determined dynamically depending on certain conditions being met, and so on. In this latter case, an appropriate combination of logic elements can be used to detect these other specific bit patterns, e.g., other than just "all ones" bit patterns.

After a byte having an "all ones" bit pattern has been identified (e.g., a first bit pattern), a coding algorithm can be applied in step 303 to transform the "all ones" bit pattern into a bit pattern that does not have "all ones" (e.g., a second bit pattern). Again, this approach can also be applied for other than "all ones" bit patterns, e.g., by encoding bytes with these other specific bit patterns (e.g., "mostly ones") into a second bit pattern not having as many "ones", and so on.

I have discovered that when a code is used to eliminate an "all ones" bit pattern in a byte being transported in parallel in the wavelength bus, then nonlinear optical impairments such as four wave mixing can be substantially reduced. In prior WDM transport schemes, one does not have control on data coherency among the optical channels since data is being transmitted serially within each optical channel. Therefore, data in one optical channel is transmitted independent of data in another optical channel and so on. By contrast, data coherency among the various optical channels can be controlled according to the principles of the invention because data is being transmitted in parallel in the wavelength bus where each optical channel in the wavelength bus carries a bit from the same byte. As such, the coincidental bits at a particular time instant in the plurality of optical channels in the wavelength bus all belong to the same byte.

So, if all bits in a particular byte are ones, e.g., an "all ones" bit pattern across the optical channels in the wavelength bus, then four wave mixing may be expected. However, coding techniques can then be applied to the byte in order to alter or transform the bit pattern by replacing a selected number of "ones" with "zeros" according to the particular coding technique being used. As a result, the effects of four wave mixing are effectively eliminated or lessened depending on the particular coding algorithm being used as well as other system parameters in the WDM system.

By way of example only, several different well-known coding techniques may be employed in step 303 to remove the "all ones" bit patterns according to the principles of the invention. Importantly, any coding technique which can transform "all ones" or other problematic bit patterns into bit patterns that do not give rise to the fiber nonlinearities can be used in conjunction with the principles of the invention. Examples of some codes suitable for use with the embodiments shown and described herein include, but are not limited to: inverse Bipolar with N-Zero Substitution (BNZS) codes, amplitude modulated codes, phase/frequency shift modulated codes, and the like. It will be appreciated that the teachings of the present invention are not limited to a particular coding scheme, but rather various well-known (or to be developed) coding schemes may be suitable given the scope of the teachings herein. Accordingly, the selection and implementation details for particular coding schemes will not be described in detail herein since these aspects will be apparent to those skilled in the art. However, to facilitate a better understanding of the operation of the embodiments shown and described herein, a brief overview of some exemplary coding schemes is provided. For a more detailed description of BNZS and other coding schemes (e.g., features, operation, implementation, etc.), see, e.g., R. E. Matlik, *"Transmission Lines for Digital and Communication Network"*, IEEE Press (1995) and Gitlin et al., *"Data Communications Principles"*, Plenum, (1992).

For example, Bipolar with N-Zero Substitution (BNZS) line encoding is an example of a well-known coding scheme that is commonly used in North America and other countries for data transmission over cable systems, e.g., T-1 digital systems. BNZS codes are typically used to prevent loss of synchronization when a long string of zeros are being transmitted on the T-1 line by replacing N number of "seros" with a special code to maintain pulse density required for synchronization. In particular, a BNZS coding scheme is used to insert bipolar violations to the AMI (Alternet Mark Inversion) encoding any time N consecutive "zeros" are being transmitted in the data stream. N is typically equal to 3, 6, or 8, with some of the more commonly used BNZS codes being B6ZS and B8ZS codes, which replace 6 or 8 consecutive "zeros" respectively.

In a simplified example of a B8ZS code, consider the following unipolar serial signal with eight contiguous "zeros":

+0+00000000++, where + signifies logic "one" and "0" signifies logic "zero". After applying a B8ZS code, the signal is converted to the following bipolar code:

+0−0−+000+−+, where + and − are logic "ones" with positive or negative polarity, and where two consecutive non-alternating symbols indicate a bipolar violation, e.g., −0− and +000+.

Because the present invention is concerned with eliminating or reducing the occurrence of "all ones" instead of "all zeros", an inverse BNZS code can be used on the following signal:

0+0++++++++0+0, again, where + signifies logic "one" and "0" signifies logic "zero". Applying the BNZS code to this signal with eight consecutive "ones" will transform the signal as follows:

0+0+00000+−0+0, again with the similar notations as previously described. Because the coding is applied to the "all ones" case, the code effectively functions as an inverse-B8ZS code, e.g., i-B8ZS.

As implied by the name, B8ZS and the i-B8ZS coding methods are applicable to serial bipolar transmission. However, voltage polarity is not relevant to optical transmission, e.g., propagation of optical pulses in an optical fiber do not have positive and negative polarity. In optical transmission, phase shifting may be one suitable option for carrying out the function otherwise carried out by polarity. For example, instead of responding to changes in polarity, a detector at the receiving end of an optical fiber can detect optical phase shift that has taken place for decoding the received signal accordingly.

More specifically, assume a case where a wavelength bus comprises eight optical channels. A BNZS coding scheme can be advantageously applied in a two-part encoding sequence. First, a BNZS code (with phase shifting in lieu of polarity) is applied to the bit stream being transported serially within each optical channel of the wavelength bus. Applying the code serially within each bit stream according to conventional methods accomplishes the originally intended function of this and other line encoding schemes, that is, to ensure that bit streams do not contain strings of "zeros" that may disrupt synchronization at the receiver and the like. Second, an i-B8ZS code is applied to the coincidental bits of a parallel-formatted byte, e.g., to the bits corresponding to the same byte, but which are formatted for transmission in each of the optical channels of the wavelength bus. As previously indicated, this latter encoding is intended to serve a different purpose than the first stage of encoding, that is, to minimize four wave mixing and other nonlinear phenomena.

Another possible coding scheme that may be employed in step 303 (FIG. 3) is amplitude modulated coding. For example, after an "all ones" bit pattern is identified in a parallel-formatted byte (while in electronic form), the "all ones" bit pattern can then be replaced with a code such as a mostly-zero code. When the data is converted to optical form (as will be described below), the amplitude of the pulses can then be amplitude modulated, e.g., amplitude increased in order to tag this coded byte to distinguish from those that have not been coded or otherwise altered. By way of example, an "all ones" bit pattern in a byte would be replaced with a mostly-zero type code, e.g., 01000010. After encoding, this coded byte would then be converted into optical format (as will be described below) with higher power (e.g., increased amplitude in the pulses) relative to the other non-altered bytes for transmission in the wavelength bus. As is well-known, amplitude modulated coding may be achieved with a adjustable/tunable filter or a dynamic attenuator. It should be noted, however, the effectiveness of amplitude modulated coding in optically amplified networks depends on the amplification scheme being used. For example, the tagged codes would need to be preserved (e.g., the increased amplitudes for some of the pulses) as the optical signals are being amplified.

Other suitable, well-known coding schemes will be apparent to those skilled in the art. For example, when an "all ones" code is detected in a byte, a coding algorithm may generate two consecutive predefined codes, e.g., 01000010 and 10110110. When the detector at the receiver sees these two predefined codes, it will then know that encoding has taken place and can initiate proper decoding of the byte. Another well-known method includes converting an i-bit code into a j-bit code, e.g., where i may equal 4 or 8 and j may equal 8 or 10, respectively. This is sometimes referred to as 4 bit/5 bit encoding or 8 bit/10 bit encoding. Again, these techniques may be used to transform an originally "all ones" or other specific bit pattern into a coded bit pattern that is then recognized at the detector appropriately. In either of these cases, the key is simply that the detector be able to distinguish between those bytes that require decoding and those that have not been encoded (e.g., if not "all ones" to begin with). Of course, those skilled in the art will recognize that these other approaches (e.g., additional codes) may occupy some of the bandwidth that would otherwise be used for real data or may also require additional channels to carry extra coding bits, and so on. These types of tradeoffs would have to be considered in view of system requirements and the like.

Returning to FIG. 3, steps 304 and 305 are carried out in accordance with the teachings in the aforementioned U.S. application Ser. No. 09/237,122 (Kartalopoulos 11). Namely, after coding is applied to remove the "all ones" or other problematic bit patterns in the parallel bytes, the data is converted from its electronic form to optical form in step 304. The individual optical channels comprising the wavelength bus are then combined in step 305 using conventional WDM techniques for transmission in an optical fiber. Although the steps in FIG. 3 are described in a particular order, it is contemplated that modifications within the spirit and the scope of the invention will be apparent to those skilled in the art. For example, the sequence of coding (step 303) and electrical-to-optical conversion (step 304) may be changed depending on the particular coding scheme being used, e.g., whether applied in the optical or electrical domain.

Figure 5:
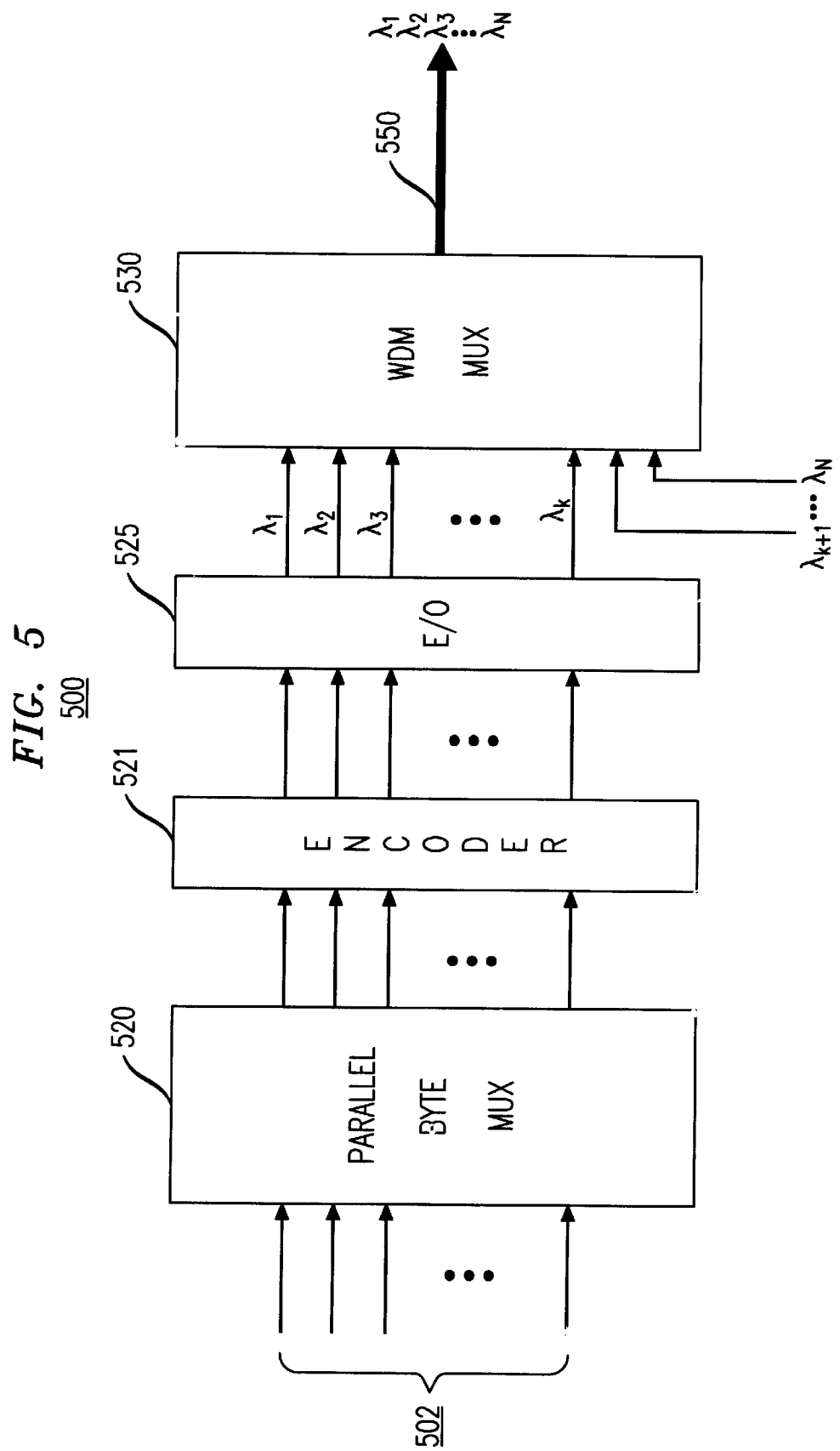
FIG. 5 is a simplified block diagram of an exemplary embodiment of a WDM system employing the wavelength bus architecture according to the principles of the invention.

FIG. 5 shows an exemplary embodiment of a WDM system 500 employing the wavelength bus architecture according to the principles of the invention. More specifically, data is supplied in a parallel format by parallel sources 502 (not shown) directly to parallel byte multiplexer 520. Multiplexer 520 multiplexes data supplied by one or more sources using parallel byte interleaving, for example, as described in U.S. application Ser. No. 09/237,122 (Kartalopoulos 11). In particular, parallel byte multiplexer 520 places the incoming data into a format, such as the format shown in FIG. 2, so that individual bits corresponding to the same byte are carried in parallel bit streams. The parallel bit streams are supplied from parallel byte multiplexer 520 to encoder 521 which carries out the coding functions previously described. Briefly restated, encoder 521 is used for detecting bytes with "all ones" bit patterns and for inserting codes as appropriate.

The parallel-formatted bytes with "non-all ones" codes, those encoded by one of the aforementioned techniques (or other suitable coding schemes), are then supplied to electrical-to-optical converters 525 which converts the bit streams from an electrical format to an optical format using well-known techniques. After conversion, each of the bit streams is associated with a single wavelength, shown here as wavelength channels $\lambda_1, \lambda_2 \ldots \lambda_k$, which together represent the wavelength bus. Using well-known WDM techniques, optical multiplexer 530 combines wavelength channels $\lambda_1$ to $\lambda_k$ from the wavelength bus with other wavelength channels, e.g., $\lambda_{k+1}$ to $\lambda_N$, which may be wavelength channels from another wavelength bus or separate wavelength channels, for transmission as a composite WDM signal along a single optical fiber 550. At a receive end of the system (not shown), the reverse process would be carried out. Of particular to the present application, a decoder (not shown) would be used to decode the incoming parallel-formatted bytes that were encoded at the transmit end (shown as system 500) with "non-all ones" code.

It should be noted that the coding scheme used in conjunction with the wavelength bus architecture according to the principles of the invention can be used to reduce the effects of four-wave mixing at both the near-end of a system, e.g., closer to the transmitter, and at the far-end of a system, e.g., closer to the receiver. However, the characteristics of four wave mixing effects may be different at the near-end and far-end and, as such, adjustments to the coding and transport scheme may be needed. In particular, power will typically be higher toward the near-end as compared to the far-end after attenuation has occurred. Consequently, the contribution of four wave mixing is expected to be present at the near-end and can be controlled as described in the foregoing embodiments.

Figure 1A:
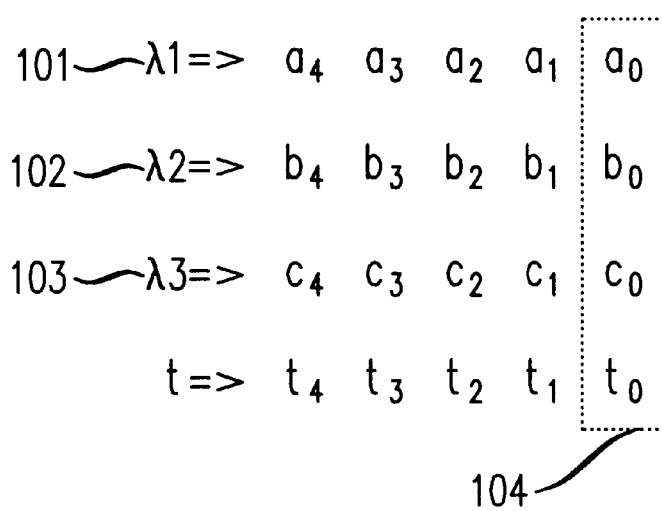
FIGS. 1A and 1B are simplified diagrams illustrating data flow within individual optical channels according to a typical WDM transport scheme.
Figure 1B:
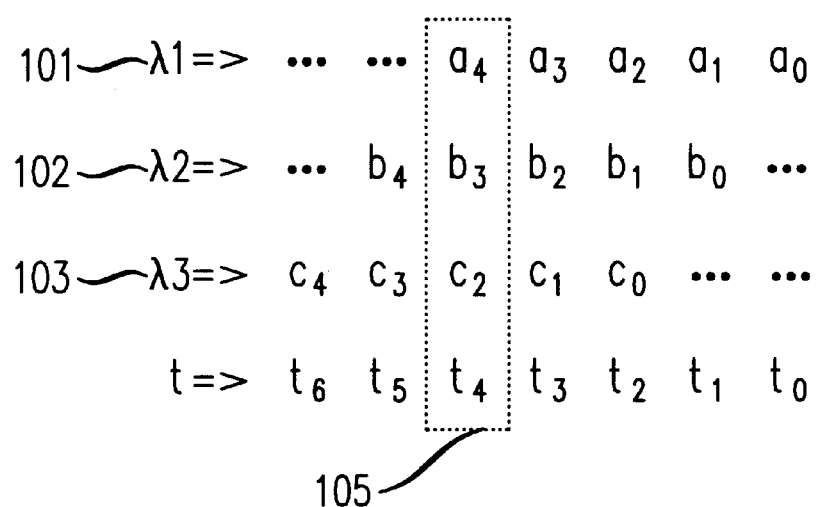

By contrast, attenuation may reduce the effects of four wave mixing at the far-end. However, if the principles of the invention are employed to control the effects of four wave mixing at the far-end, other factors may warrant consideration. For example, it is well known that light pulses may travel at different velocities at different wavelengths in the different optical channels. Consequently, light pulses (corresponding to the parallel bytes) traveling along an optical fiber at different wavelengths in different optical channels may be skewed relative to their starting sequence. The effects of propagation delays on the coincidence of bits was previously described in FIG. 1B.

Figure 6:
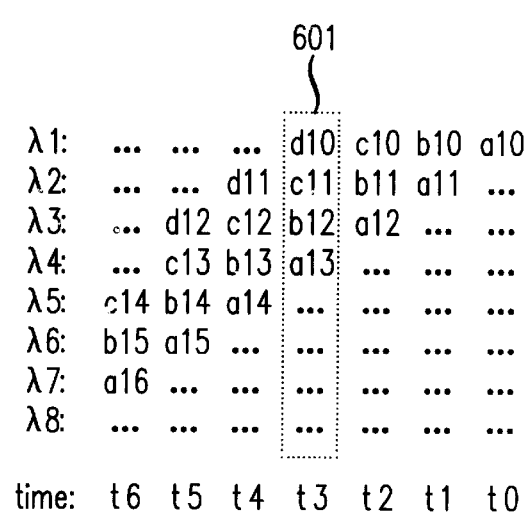
FIG. 6 illustrates how coding can be applied to bytes transmitted in parallel in a wavelength bus in the presence of propagation delays according to the principles of the invention.

According to another aspect of the invention, the parallel-formatting of bytes in the optical channels of the wavelength bus facilitates the identification of "all ones" in the individual optical channels even in the presence of wavelength-dependent propagation delays. FIG. 6 shows a simplified example of how bits in a particular byte can become no longer coincident as a result of propagation delays. More specifically, FIG. 6 shows a wavelength bus having eight optical channels wherein block 601 illustrates how coincident bits now include bits from various bytes, e.g., $d_{10}$, $c_{11}$, and so on.

In general, parallel transmission is more conductive to reconciling bit positions across the various optical channels in a wavelength bus as compared to when data is transmitted independently and serially in each of the optical channels as in prior systems. More specifically, because bytes are transmitted in parallel across all optical channels in the wavelength bus, the coding and decoding algorithms can be adjusted to account for the possibility that bits corresponding to a particular byte are located several "columns" or positions in time apart. As shown in FIG. 6, for example, bits $d_{10}$, $d_{11}$ and $d_{12}$ are located at time instants $t_3$, $t_4$, and $t_5$, respectively. So, by knowing the starting byte composition of byte d, characteristics of the optical transmission system (e.g. fiber length, dispersion characteristics, etc.), and so on, the bits corresponding to a particular byte can be located easier in a parallel-formatted wavelength bus a compared to prior systems where data transmission is independent in each channel. Consequently, by being able to locate the bits corresponding to a particular byte at the far-end of a system after propagation delays, the coding algorithms can be used a previously described to eliminate the "all ones" bit patterns in the coincidental bits, i.e., all the bits in a given byte, and decoding can be used to restore the original bit pattern of the byte.

The foregoing is merely illustrative of the principles of the invention. Those skilled in the art will be able to devise numerous arrangements, which, although not explicitly shown or described herein, nevertheless embody principles that are within the spirit and scope of the invention. For example, although several different coding schemes were shown and described in the various embodiments, these examples were meant to be illustrative and not exhaustive in any way. It will be appreciated by those skilled in the art that other suitable coding schemes may also be employed in accordance with the teachings of the invention. Moreover, the transport scheme described herein is equally applicable to digital communications systems, computer communications systems, and the like. Accordingly, the scope of the invention is limited only by the claims that follow.

I claim:

1. A method of operating a wavelength division multiplexed system in which data is transmitted in a parallel format using a plurality of optical channels, the method comprising:

detecting the presence of a first bit pattern in the data; and when the first bit pattern is detected, encoding the data to change the first bit pattern to a second bit pattern, wherein transmission of the data with the second bit pattern is less susceptible to nonlinear optical impairments relative to the data with the first bit pattern.

2. The method according to claim 1, wherein the system includes N optical channels, wherein the data is formatted as bytes, each byte having N bits, and wherein each optical channel carries a corresponding one of the N bits of a byte.

3. The method according to claim 2, wherein the step of detecting includes checking the N bits corresponding to a byte in each of the N optical channels.

4. The method according to claim 2, wherein the step of encoding further comprises:

detecting the presence of a third bit pattern in bits transmitted serially in each of the N optical channels; and when the third bit pattern is detected, applying a predefined code to change the third bit pattern to a fourth bit pattern.

5. The method according to claim 2, wherein each of the N bits in the first bit pattern comprises a digital bit "1" and wherein one or more of the N bits in the second bit pattern comprise a digital bit "0".

6. The method according to claim 5 wherein the step of encoding includes the step of applying a code selected from the group consisting of a Bipolar with N-Zero Substitution (BNZS) code, an amplitude modulated code, a phase shifting modulated code, and a frequency shifting modulated code.

7. The method according to claim 6 wherein the step of encoding using the amplitude modulated code further comprises:

converting the N bits in the second bit pattern from an electrical format to optical format; and when in the optical format, modulating the amplitude of selected ones of the N bits in the second bit pattern.

8. The method according to claim 6 wherein the step of encoding using the phase shifting modulated code further comprises:

converting the N bits in the second bit pattern from an electrical format to optical format; and when in the optical format, modulating the phase of selected ones of the N bits in the second bit pattern.

9. The method according to claim 6 wherein the step of encoding using the frequency shifting modulated code further comprises:

converting the N bits in the second bit pattern from an electrical format to optical format; and when in the optical format, modulating the frequency of selected ones of the N bits in the second bit pattern.

10. The method according to claim 1, wherein the nonlinear optical impairments include four wave mixing, and wherein the step of encoding reduces power in a four wave mixing product.

11. A method of operating a wavelength division multiplexed system comprising:

transmitting data in a parallel format using a plurality of optical channels;

detecting the presence of a first bit pattern in the data; and when the first bit pattern is detected, encoding the data to change the first bit pattern to a second bit pattern, wherein transmission of the data with the second bit pattern is less susceptible to nonlinear optical impairments relative to the data with the first bit pattern.

12. A method of operating a wavelength division multiplexed system having N optical channels, the method comprising:

arranging bytes in a parallel format, each byte having N bits, so that a corresponding one of the N bits of a byte is capable of being transmitted in a corresponding one of the N optical channels;

detecting the presence of a first bit pattern in the byte by checking the N bits corresponding to the byte in each of the N optical channels;

when the first bit pattern is detected, applying a predefined code to the byte to change the first bit pattern to a second bit pattern;

transmitting the byte with the second bit pattern using the N optical channels, whereby transmission of the byte with the second bit pattern is less susceptible to nonlinear optical impairments relative to the byte with the first bit pattern.

13. A wavelength division multiplexed system comprising:

a transmitter apparatus for transmitting data in a parallel format using a plurality of optical channels; and an encoder for detecting the presence of a first bit pattern in the data, and when the first bit pattern is detected, for applying a predefined code to the data to change the first bit pattern to a second bit pattern, wherein transmission of the data with the second bit pattern is less susceptible to nonlinear optical impairments relative to the data with the first bit pattern.

14. The system according to claim 13, wherein the system includes N optical channels, wherein the data is formatted as bytes, each byte having N bits, and wherein each optical channel carries a corresponding one of the N bits of a byte.

15. The system according to claim 14, wherein the encoder is operable to identify the first bit pattern by checking the N bits corresponding to a byte in each of the N optical channels.

* * * * *